United States Patent [19]

Hoshi

[11] Patent Number: 5,239,429
[45] Date of Patent: Aug. 24, 1993

[54] VIDEO SIGNAL REPRODUCING APPARATUS

[75] Inventor: Hidenori Hoshi, Kanagawa, Japan

[73] Assignee: Canon Kabushiki Kaisha, Tokyo, Japan

[21] Appl. No.: 479,175

[22] Filed: Feb. 13, 1990

[30] Foreign Application Priority Data

Feb. 21, 1989 [JP] Japan .................................. 1-39344

[51] Int. Cl.⁵ ............................................. G11B 19/02
[52] U.S. Cl. .............................. 360/72.1; 360/73.06; 360/36.2
[58] Field of Search ...................... 360/10.1, 10.2, 10.3, 360/27, 72.2, 73.01, 72.1, 73.04, 73.05, 73.08, 73.06; 358/310, 311, 312, 335

[56] References Cited

U.S. PATENT DOCUMENTS

| | | | |
|---|---|---|---|
| 4,675,753 | 6/1987 | Takayama et al. | 360/27 |
| 4,841,380 | 6/1989 | Kozuki et al. | 360/10.2 |
| 4,853,803 | 8/1989 | Fukatsu et al. | 360/73.01 |
| 4,873,587 | 10/1989 | Yoshimura et al. | 360/10.2 |
| 4,956,725 | 9/1990 | Kozuki et al. | 360/12 |

FOREIGN PATENT DOCUMENTS 63-058690  3/1988  Japan ................................ 360/73.04

Primary Examiner—Andrew L. Sniezek
Attorney, Agent, or Firm—Robin, Blecker, Daley & Driscoll

[57] ABSTRACT

A video signal reproducing apparatus for reproducing video signals from a tape-shaped recording medium with a rotary head. A memory capable of storing at least a video signal corresponding to one field is provided. The transport speed of the tape-shaped recording medium is alternately set to a second speed higher than the tape transport speed at the time of recording and a first speed lower than the second speed. The video signal reproduced from the recording medium transported at the first speed is written in the memory, and the video signal read out of the memory is output when the recording medium is transported at the second speed.

14 Claims, 3 Drawing Sheets

VIDEO SIGNAL REPRODUCING APPARATUS

BACKGROUND OF THE INVENTION

1. Field of the Invention

This invention relates to video signal reproducing apparatus and, more particularly, to an apparatus for reproducing a video signal from a tape-shaped recording medium by using a rotary head.

2. Description of the Related Art

Systems for recording video signals on tape-shaped recording mediums include a digital video tape recorder (VTR) in which video signals for one picture are separated into a plurality of blocks and are encoded with respect to each block unit, and data or codes such as sync codes, block ID (index) data, and error detection/correction parity codes are added to the encoded signals to form data blocks which are recorded on a magnetic tape by a rotary head in a diagonal recording manner. Data blocks for one picture are recorded in a plurality of tracks.

At the time of reproduction, data blocks in the respective recording tracks are converted into electrical signals by the rotary head, and errors in the video data are detected and corrected based on the parities in the data blocks, so that the original video signal is restored based on the sync codes and the block ID (address) data of the data blocks. FIG. 1 is a block diagram showing the basic construction of a reproduction system of an ordinary digital VTR. Sync codes are extracted by a reproduction processing circuit 10 from reproduction data reproduced by a rotary head H from a video tape T used as a recording medium. Video data, address data and other kinds of added data are extracted based on the sync codes. The series of data items thereby obtained are supplied to an error discrimination/correction circuit 12, and code errors are corrected by this circuit. The data is thereafter written in a frame memory 14. Write addresses used for this writing are determined in accordance with the address data separated in the reproduction processing circuit 10. The data stored in the frame memory 14 is read out based on read address data supplied from a read address generating circuit 16 and is supplied to an output terminal 18.

A capstan control circuit 8 drives a capstan 6 in accordance with a reproduction instruction from a system controller 4 so that the tape T is transported at the same speed as the speed maintained at the time of recording. The capstan control circuit 8 also effects tracking control in a well-known manner in order to make the head H accurately trace each track. Methods for this tracking control are known, including one in which a control signal recorded on a tape end is used, and one in which a pilot signal recorded in each track is used.

The realization of a search reproduction function of the digital VTR is considered herein whose function corresponds to that of an analog VTR for recording a video signal on a video tape in an analog recording manner. The search function is a function for making the magnetic tape travel at a speed higher than the speed set for recording or ordinary reproduction to enable the contents of recording on the magnetic tape to be observed in a short time. In the case of an analog VTR, while the rotary magnetic head moves across a plurality of tracks, part of a signal is reproduced from each track, and reproduced parts are combined to form and display one complete picture.

If the digital VTR performs the same reproduction operation as this analog VTR, signals obtained from the respective tracks by moving the rotary magnetic head across the tracks are not always based on the above-mentioned data block unit. There is, therefore, a strong possibility of failure to completely obtain data for each data block and, hence, failure to perform the desired error correction, resulting in a considerable increase in the error rate or an inability to correct error. That is, in a case where, in the digital VTR, the rotary magnetic head and the magnetic tape are operated for search reproduction in the same manner as the analog VTR, there are many data blocks which cannot be completely restored; the number of data blocks completely restored is very small. Even though interpolation is effected between frames with respect to data blocks which cannot be restored, the extent of divergence from data on adjacent picture elements with respect to time is very large and the reproduced image is very poor.

SUMMARY OF THE INVENTION

It is an object of the present invention to solve these problems under the above-described circumstances.

It is another object of the present invention to provide a video signal reproducing apparatus capable of enabling the contents of a video signal recorded on a tape to be ascertained in a short time.

It is still another object of the present invention to provide a video signal reproducing apparatus capable of obtaining good reproduced images even if the tape is transported at a high speed.

To these ends, the present invention provides in one of its aspects a video signal reproducing apparatus comprising: reproduction means for reproducing a video signal from a tape-shaped recording medium by using a rotary head; transport means for transporting the tape-shaped recording medium; memory means for storing part of the video signal corresponding to a particular picture and reproduced by the reproduction means, and repeatedly outputting the stored part of the video signal for the particular picture; and control means for controlling the transport means so that the speed at which the tape-shaped recording medium is transported is set to a first speed during a particular period of time including at least the period of time in which the memory means effects writing of the video signal, and that the transport speed of the tape-shaped recording medium is set to a second speed during a period of time other than the particular period of time, the second speed being higher than the transport speed of the recording medium set at the time of recording of the video signal on the recording medium, the first speed being lower than the second speed.

These and other objects and features of the present invention will become clear upon reading the following detailed description of the embodiment of the present invention taken in conjunction with the accompanying drawings.

DETAILED DESCRIPTION OF THE PREFERRED EMBODIMENTS

An embodiment of the present invention will be described below with reference to the accompanying drawings.

Figure 2:
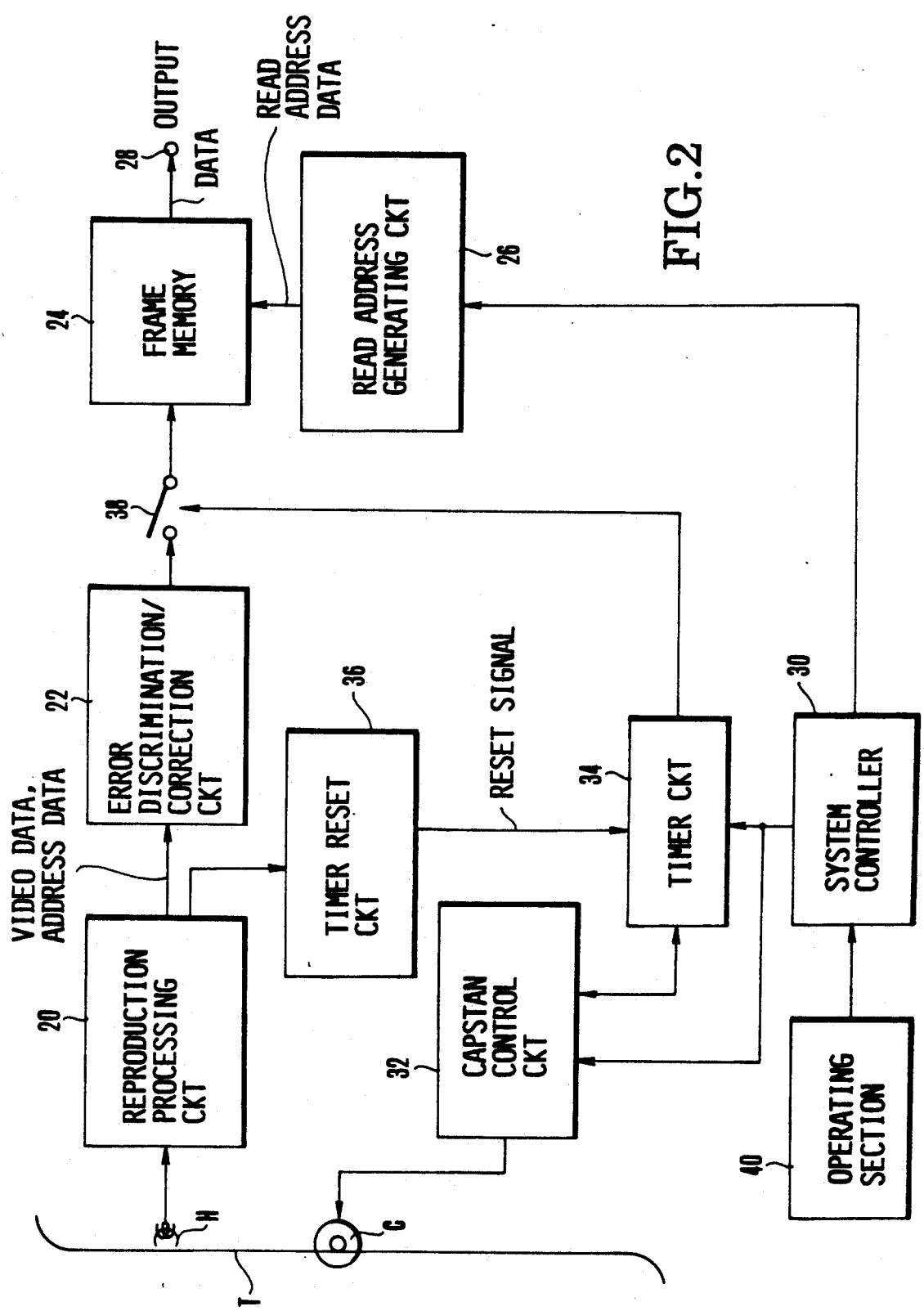
FIG. 2 is a diagram of a reproduction system of a digital VTR which represents an embodiment of the present invention.

FIG. 2 shows a block diagram of the construction of a reproduction system of a digital VTR which presents the embodiment of the present invention. The digital VTR has a reproduction processing circuit 20 for extracting sync codes from data blocks reproduced from a magnetic tape T and separating and outputting video data, address data and other kinds of added data by using the sync codes, an error discrimination/correction circuit 22, a frame memory 24, a read address generating circuit 26, an output terminal 28, a system controller 30 for generating a multiplication signal representing a reproduction speed multiplying factor n in a changed speed reproduction mode, a capstan control circuit 32, a timer circuit 34, a timer reset circuit 36 for outputting a reset signal to the timer circuit 34 in response to the completion of reproduction of one frame effected by the reproduction processing circuit 20 at the same speed as recording, and a normally-closed switch 38 controlled for opening and closing by an output from the timer circuit 34.

The digital VTR further includes an operating section 40 for designating each of the operational modes of this VTR, the tape T, a rotary head H, and a capstan C.

Figure 1:
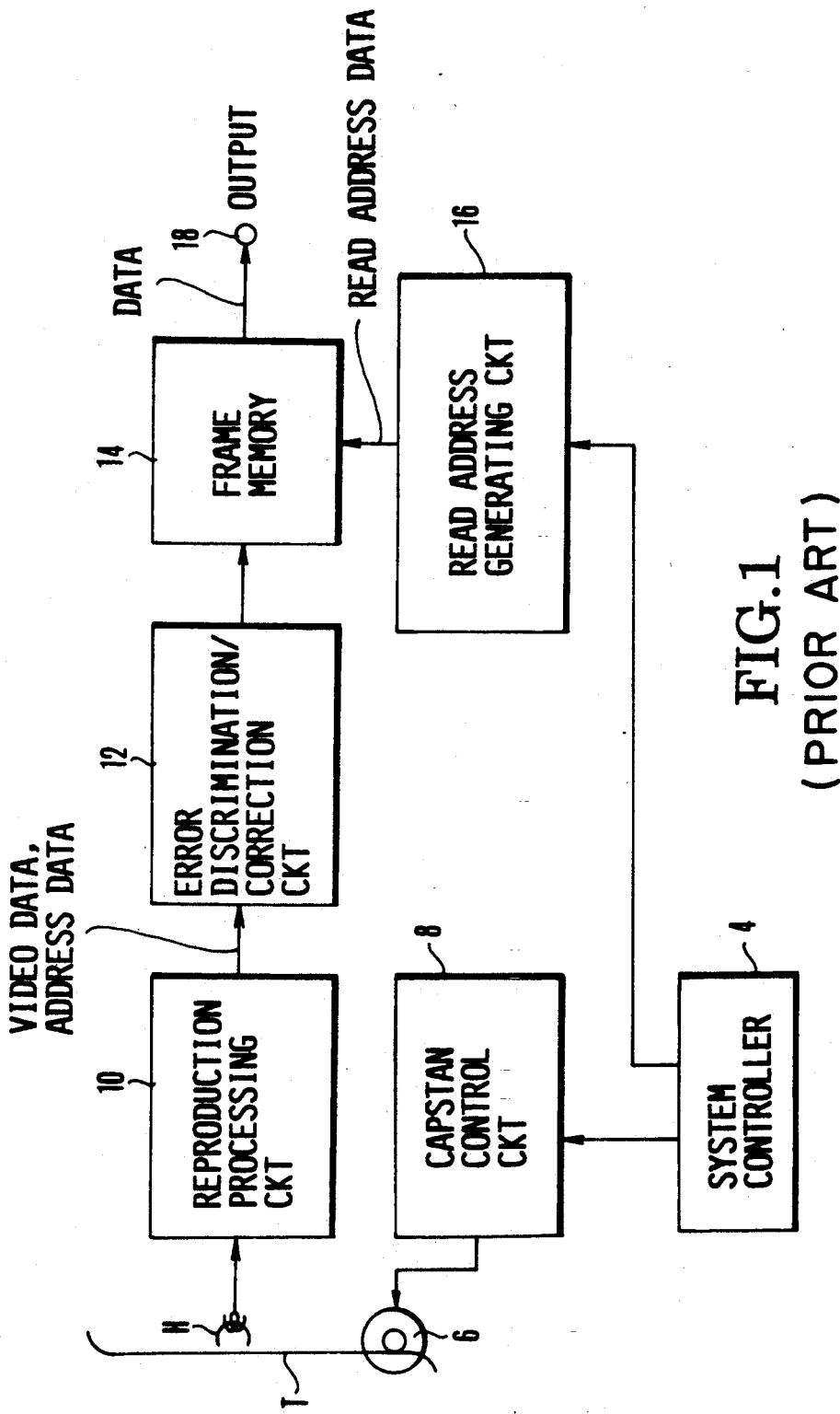
FIG. 1 is a diagram of the construction of a reproduction system of an ordinary digital VTR.

The operation of the digital VTR of this embodiment at the time of ordinary reproduction is the same as the digital VTR shown in FIG. 1. A signal reproduced by the head H is supplied to the reproduction processing circuit 20, the video data, the address data and so on are separated from this signal, and code error correction is effected by the error discrimination/correction circuit 22.

At the time of reproduction, the switch 38 is closed, and the data processed for error correction is written in the frame memory 24 based on the address data separated by the reproduction processing circuit 20. The address data indicates the position of each video data item on the picture and is determined in accordance with, for example, the order of raster scan of the picture. As the read address data supplied from the read address generating circuit 26 is successively incremented, video signals are read out of the frame memory 24 in the order of the raster scan. At this time, the capstan control circuit 32 operates in accordance with the instruction from the system controller 30 to drive the capstan C so as to transport the tape T at the same speed as the recording operation. Needless to say, the arrangement is such that tracking control is effected by controlling this tape T transportation.

The operation of the digital VTR of FIG. 2 at the time of high speed search reproduction will be described below.

Figure 3:
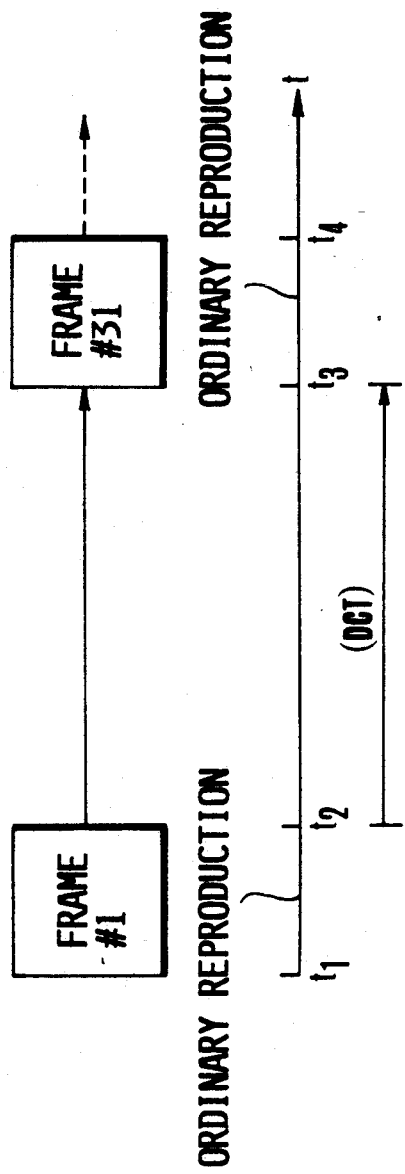
FIG. 3 is a timing chart showing the operation of the VTR shown in FIG. 2.

FIG. 3 shows the timing of operation of the digital VTR in accordance with this embodiment at the time of high speed search reproduction. The VTR is first set to the ordinary reproduction mode for a period of time corresponding to one frame starting from a reproduction start point t1, and video signals for one frame are reproduced from several recording tracks by the rotary magnetic head H. At this time, the reproduction data output from the reproduction processing circuit 20 undergoes error correction effected by the error discrimination/correction circuit 22 in the same manner as the ordinary reproduction operation and is written in the frame memory 24 through the switch 38. The data stored in the frame memory 24 is read out based on the read address supplied from the read address generating circuit 26 and is output to the output terminal 28. This operation is the same as the ordinary reproduction operation.

When the reproduction of one frame is completed at a time t2 shown in FIG. 3, the reproduction processing circuit 20 supplies a reproduction completion signal representing the end of the data for each frame to the timer reset circuit 36, and the time reset circuit 36 supplies, in response to this signal, a reset signal to the timer circuit 34. The timer circuit 34 is reset by the reset signal, thereby setting the switch 38 in the open state. The write in the frame memory 24 is thereby stopped, and the output image signal supplied to the output terminal 28 represents a frozen image based on the image data stored in the memory 24. That is, after the time t2, the video signal stored in the memory 24 is repeatedly read out. In the timer circuit 34, the time DCT for suspension of write in the frame memory 24 is set according to the desired high-speed search speed.

For example, if the tape transport speed is ten times as high as the speed for ordinary recording and if DCT is 2/30 sec., $[(10 \times 2 + 1)/(2 + 1) =]$ 7-fold speed search can be realized. During the period of time DCT, the timer circuit 34 maintains the switch 38 in the open state and simultaneously instructs the capstan control circuit 32 to make the magnetic tape T travel at a speed n (n>1) times as high as the speed at the time of recording. As mentioned above, the image data reproduced during the time DCT is neither written in the frame memory 24 nor output to the output terminal 28. Needless to say, during the period of time DCT, it is sufficient to perform minimum processing necessary for the detection of the number of passed recording tracks with the reproduction processing circuit 20 and the error discrimination/correction circuit 22; it is not necessary to perform other kinds of processing such as decoding of the reproduced data blocks, error correction and interpolation.

When the time DCT is counted up based on the timing of t3 by the timer circuit 34, the timer circuit 34 closes the switch 38 and makes the magnetic tape T travel at the same speed as the recording operation. The reproduction processing circuit 20 reproduces the image data for one frame after t3, and the output from this circuit is written in the frame memory 24 through the error discrimination/correction circuit 22 and the switch 38.

The video signal stored in the memory 24 is thereby updated. After the time t4 shown in FIG. 3, the data written in the memory 24 during the period of time between t3 and t4 is repeatedly read out.

As described above, the traveling speed of the magnetic tape is intermittently changed to repeat the above-described operations, and the data stored in the memory 24 is updated one time by the data reproduced from the magnetic tape in each predetermined period, thereby enabling the data output from the frame memory 24 to be obtained as time-lapse video data to form high-speed search pictures.

Generally, if the search multiplying factor is x, the tape transport speed at the time of high-speed tape transport is n times as high as that at the time of recording and the period of time DCT is t (sec.), the following relationship is established:

$$x = (30 \cdot n \cdot t + 1)/(1 + 30 \cdot t)$$

In the above-described embodiment, the timer circuit 34 is reset by using information on the recording in the final track of one frame. Alternatively, the arrangement may be such that time codes are recorded in a linear track formed at a tape end, and the timer is reset by using the time codes.

In the above-described embodiment, the period for the ordinary reproduction mode is equal to one frame period, but it is generally possible to obtain the same effect by setting the period for this mode to the period corresponding to i frames (i: an integer equal to or greater than 1).

In accordance with the above-described embodiment, while high-speed transportation and low-speed transportation are repeated, the low-speed transportation is effected at the same speed as the speed for the ordinary recording or reproduction, but it is possible to increase the number of data blocks which can be completely reproduced to improve the qualities of the reproduced image even if these speeds are not always equal to each other.

As can be clearly understood from the above description, the present invention reduces, even at the time of high-speed reproduction, the number of data blocks which cannot be reproduced and enables formation of high-quality reproduced images.

What is claimed is:

1. A video signal reproducing apparatus comprising:
   (a) reproduction means for reproducing a video signal from a tape-shaped recording medium by using a rotary head;
   (b) transport means for transporting said tape-shaped recording medium;
   (c) memory means for storing part of the video signal;
   (d) writing means for writing part of the video signal corresponding to a particular picture and reproduced by said reproduction means in place of the stored part of the video signal in said memory means;
   (e) reading means for repeatedly reading the particular picture of the video signal from said memory means, and
   (f) control means for controlling said transport means so that a speed at which the tape-shaped recording medium is transported is set to a first speed during a particular period of time including at least a period of time in which said writing means writes the part of the video signal, and that a transport speed of the tape-shaped recording medium is set to a second speed during a period of time of repeated reading of said memory means other than said particular period of time, said second speed being higher than a transport speed of the recording medium set at the time of recording of the video signal on the recording medium, said first speed being lower than said second speed.

2. An apparatus according to claim 1, wherein said first speed is equal to the transport speed of the recording medium set at the time of recording of the video signal.

3. An apparatus according to claim 1, wherein said writing means writes, in a predetermined periodicity, part of the video signal corresponding to one picture and reproduced by said reproduction means in said memory.

4. An apparatus according to claim 1, wherein said reproduction means further reproduces, from the recording medium, address data indicating the position of said particular picture of the video signal reproduced in a unit time, and said writing means writes the video signal reproduced by said reproduction means in said memory means based on the address data reproduced by said reproduction means.

5. An apparatus according to claim 1, wherein said control means in capable of changing the length of said particular period of time relative to the other period of time.

6. An apparatus according to claim 1, wherein said memory means stores the video signal as a digital signal.

7. An apparatus according to claim 6, wherein said reproduction means reproduces the video signal in the form of a digital signal, and includes means for correcting code errors in the digital video signal.

8. A video signal reproducing apparatus comprising:
   (a) reproduction means for reproducing a video signal from a tape-shaped recording medium by using a rotary head;
   (b) transport means for transporting said tape-shaped recording medium;
   (c) memory means for storing a first part of the video signal;
   (d) writing means for writing a second part of the video signal reproduced by said reproduction means in place of the stored first part of the video signal in said memory means;
   (e) reading means for repeatedly reading the stored second part of the video signal from said memory means;
   (f) control means for controlling said transport means so that a speed at which the tape-shaped recording medium is transported is alternately set to first and second speeds in a predetermined periodicity, and said second speed being higher than a transport speed of the recording medium set at the time of recording of the video signal on the recording medium and corresponding to the time of repeated reading of said memory means, said first speed being lower than said second speed and corresponding to the time said writing means writes the second part of the video signal into the memory means; and
   (g) inhibition means for inhibiting writing of the video signal in said memory means while the recording medium is transported at said second speed.

9. An apparatus according to claim 8, wherein said first speed is equal to the transport speed of the recording medium set at the time of recording of the video signal.

10. An apparatus according to claim 8, wherein said inhibition means inhibits writing in said memory means with respect to a unit of the video signal corresponding to one picture reproduced by said reproduction means.

11. An apparatus according to claim 8, wherein said inhibition means operates so that only part of the video signal corresponding to one picture is written in said memory means in a predetermined periodicity.

12. An apparatus according to claim 8, wherein said control means is capable of changing the ratio of the period of time in which the transport speed of the tape-shaped recording medium is set to said first speed to the period of time in which the transport speed is set to said second speed.

13. A video signal reproducing apparatus comprising:
(a) reproduction means for reproducing a video signal from a tape-shaped recording medium by using a rotary head;
(b) transport means for transporting said tape-shaped recording medium;
(c) memory means for storing part of the video signal corresponding to one picture;
(d) writing means for writing part of the video signal corresponding to another picture and reproduced by said reproduction means in place of said one picture of the video signal in said memory means;
(e) reading means for repeatedly reading out said part of said another picture of the video signal from said memory means; and
(f) control means for changing, in a predetermined periodicity, the speed at which the tape-shaped recording medium is transported by said transport means during a particular period of time including at least a period of time in which said writing means writes said part of said another picture of the video signal, the maximum amount of speed changed by said control means during a period of time of repeated reading of said memory means other than said particular period of time being higher than a transport speed of the recording medium set at the time of recording of the video signal on the recording medium.

14. An apparatus according to claim 13, wherein the minimum amount of speed changed by said control means is equal to the transport sped of the recording medium set at the time of recording of the video signal.

* * * * *

UNITED STATES PATENT AND TRADEMARK OFFICE
CERTIFICATE OF CORRECTION

PATENT NO.    : 5,239,429
DATED         : August 24, 1993
INVENTOR(S)   : Hidenori Hoshi It is certified that error appears in the above-identified patent and that said Letters Patent is hereby corrected as shown below:

Col. 6, line 56.   After "writing" insert -- the second part of the video signal --

Col. 8, line 15.   Change "sped" to -- speed --

Signed and Sealed this

Fifteenth Day of March, 1994

Attest:

BRUCE LEHMAN

Attesting Officer                Commissioner of Patents and Trademarks